(12) United States Patent
Nachenberg et al.

(10) Patent No.: US 7,444,331 B1
(45) Date of Patent: Oct. 28, 2008

(54) DETECTING CODE INJECTION ATTACKS AGAINST DATABASES

(75) Inventors: Carey S. Nachenberg, Northridge, CA (US); Pak Wai Yung, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 266 days.

(21) Appl. No.: 11/071,400

(22) Filed: Mar. 2, 2005

(51) Int. Cl.
G06F 7/00 (2006.01)
G06F 17/30 (2006.01)

(52) U.S. Cl. .................................. 707/6; 707/1; 707/3
(58) Field of Classification Search .................... 707/2, 707/3, 4, 9, 10, 100, 102, 104.1
See application file for complete search history.

(56) References Cited

U.S. PATENT DOCUMENTS

| | | | |
|---|---|---|---|
| 4,959,849 A | 9/1990 | Bhusri | |
| 5,040,214 A | 8/1991 | Grossberg et al. | |
| 5,355,474 A | 10/1994 | Thuraisngham et al. | |
| 5,546,576 A * | 8/1996 | Cochrane et al. | 707/2 |
| 5,584,024 A * | 12/1996 | Shwartz | 707/4 |
| 5,664,172 A | 9/1997 | Antoshenkov | |
| 5,742,806 A | 4/1998 | Reiner et al. | |
| 5,768,422 A | 6/1998 | Yaeger | |
| 5,774,888 A * | 6/1998 | Light | 707/1 |
| 5,812,840 A * | 9/1998 | Shwartz | 707/4 |
| 5,826,076 A | 10/1998 | Bradley et al. | |
| 6,088,803 A | 7/2000 | Tso et al. | |
| 6,128,740 A | 10/2000 | Curry et al. | |
| 6,212,524 B1 * | 4/2001 | Weissman et al. | 707/101 |
| 6,282,539 B1 * | 8/2001 | Luca | 707/6 |
| 6,311,278 B1 | 10/2001 | Raanan et al. | |
| 6,314,409 B2 | 11/2001 | Schneck et al. | |
| 6,356,887 B1 | 3/2002 | Berenson et al. | |
| 6,584,569 B2 | 6/2003 | Reshef et al. | |
| 6,598,038 B1 | 7/2003 | Guay et al. | |
| 6,775,657 B1 | 8/2004 | Baker | |

(Continued)

FOREIGN PATENT DOCUMENTS

EP 287310 A2 * 10/1988
WO WO 01/71499 A1 9/2001

OTHER PUBLICATIONS

Rennhackkamp, Martin., "Managing Dynamic Queries" (Teleran Systems), DBMS, v11, pp. 1-4.*

(Continued)

*Primary Examiner*—Pierre M. Vital
*Assistant Examiner*—Christopher P Nofal
(74) *Attorney, Agent, or Firm*—Fenwick & West LLP (57) ABSTRACT

A database server receives an incoming query and converts the query into its canonical form. The database server compares the canonical incoming query with stored template queries. If the incoming query matches one of the stored template queries, then the query is legitimate and the query is executed on the database. If the canonical incoming query does not match one of the stored template queries, then the database server determines whether the incoming query is malicious or anomalous. The database server identifies tokens in the incoming query that are not present in a similar template query. If the tokens have meaning in the language utilized to express the query, the database server declares the query malicious. Otherwise, the database server declares the query anomalous.

23 Claims, 5 Drawing Sheets

U.S. PATENT DOCUMENTS

| | | | |
|---|---|---|---|
| 6,775,827 B1 | 8/2004 | Harkins | |
| 6,839,850 B1 | 1/2005 | Campbell et al. | |
| 6,928,553 B2 | 8/2005 | Xiong et al. | |
| 7,050,936 B2 | 5/2006 | Levy et al. | |
| 7,085,780 B2 | 8/2006 | Sakamoto et al. | |
| 7,085,928 B1 | 8/2006 | Schmid et al. | |
| 7,099,871 B2* | 8/2006 | Faybishenko et al. | 707/10 |
| 7,120,645 B2 | 10/2006 | Manikutty et al. | |
| 7,120,933 B2 | 10/2006 | Mattsson | |
| 7,185,232 B1 | 2/2007 | Leavy et al. | |
| 7,237,265 B2 | 6/2007 | Reshef et al. | |
| 2002/0065896 A1 | 5/2002 | Burakoff et al. | |
| 2002/0083343 A1 | 6/2002 | Crosbie et al. | |
| 2002/0087882 A1 | 7/2002 | Schneider et al. | |
| 2002/0133606 A1* | 9/2002 | Mitomo et al. | 709/229 |
| 2002/0157020 A1 | 10/2002 | Royer | |
| 2003/0037251 A1* | 2/2003 | Frieder et al. | 713/200 |
| 2003/0051026 A1 | 3/2003 | Carter et al. | |
| 2003/0069880 A1* | 4/2003 | Harrison et al. | 707/3 |
| 2003/0101355 A1 | 5/2003 | Mattsson | |
| 2003/0133554 A1 | 7/2003 | Nykanen et al. | |
| 2003/0145226 A1 | 7/2003 | Bruton et al. | |
| 2003/0154402 A1 | 8/2003 | Pandit et al. | |
| 2003/0167229 A1 | 9/2003 | Ludwig et al. | |
| 2003/0188189 A1 | 10/2003 | Desai et al. | |
| 2003/0204719 A1 | 10/2003 | Ben-Itzhak | |
| 2003/0221123 A1 | 11/2003 | Beavers | |
| 2004/0098617 A1 | 5/2004 | Sekar | |
| 2004/0098623 A1 | 5/2004 | Scheidell | |
| 2004/0139061 A1* | 7/2004 | Colossi et al. | 707/3 |
| 2004/0193656 A1 | 9/2004 | Pizzo et al. | |
| 2004/0199535 A1 | 10/2004 | Zuk | |
| 2004/0205360 A1 | 10/2004 | Norton et al. | |
| 2004/0220915 A1 | 11/2004 | Kline et al. | |
| 2004/0250127 A1 | 12/2004 | Scoredos et al. | |
| 2004/0250134 A1 | 12/2004 | Kohler et al. | |
| 2004/0254919 A1* | 12/2004 | Giuseppini | 707/3 |
| 2004/0260945 A1 | 12/2004 | Raikar et al. | |
| 2005/0086529 A1 | 4/2005 | Buchsbaum | |
| 2005/0097149 A1* | 5/2005 | Vaitzblit et al. | 707/202 |
| 2005/0108063 A1* | 5/2005 | Madill et al. | 705/4 |
| 2005/0138006 A1 | 6/2005 | Bennett et al. | |
| 2005/0138426 A1 | 6/2005 | Styslinger | |
| 2005/0154733 A1 | 7/2005 | Meltzer et al. | |
| 2005/0203886 A1* | 9/2005 | Wong | 707/3 |
| 2005/0203921 A1* | 9/2005 | Newman et al. | 707/100 |
| 2005/0273859 A1 | 12/2005 | Chess et al. | |
| 2005/0289187 A1 | 12/2005 | Wong et al. | |
| 2006/0070128 A1 | 3/2006 | Heimerdinger et al. | |
| 2006/0117386 A1 | 6/2006 | Gupta et al. | |
| 2006/0212438 A1 | 9/2006 | Ng | |
| 2006/0212941 A1 | 9/2006 | Bronnikov et al. | |
| 2006/0242136 A1 | 10/2006 | Hammond et al. | |
| 2006/0248440 A1* | 11/2006 | Rhoads et al. | 715/500 |
| 2006/0271708 A1* | 11/2006 | Bolles et al. | 709/246 |
| 2007/0074188 A1 | 3/2007 | Huang et al. | |
| 2007/0094728 A1 | 4/2007 | Julisch et al. | |
| 2007/0156666 A1* | 7/2007 | VanRiper et al. | 707/4 |
| 2007/0169194 A1 | 7/2007 | Church et al. | |

OTHER PUBLICATIONS

AirCERT web page, last updated Sep. 18, 2000 [online]. Cert.org [retrieved Apr. 18, 2003]. Retrieved from the Internet<URL:http://www.cert.org/kb/aircert/>.

Analysis Console for Intrusion Detection (ACID) web page [online]. Andrew.cmu.edu [retrieved Apr. 18, 2003]. Retrieved from the Internet<URL:http://www.andrew.cmu.edu/~rdanyliw/snort/snortacid.html>.

"Caltarian Security Technology Platform," Riptech web pages [online]. Symanec.com [retrieved Apr. 18, 2003]. Retrieved from the Internet<URL:http://wnterprisesecurity.symantec.com/Content/displayPDF.cfm?SSSPDFID=35&EID=O>.

Change log for Analysis Console for intrusion Detection (Acid), indicating release date of Sep. 8, 2000 [online]. Andrew.cmu.edu [retrieved Apr. 18, 2003]. Retrieved from the Internet:<URL:http://www.andrew.cmu.edu/~rdanyliw/snort/CHANGELOG>.

CyberGuard Corporation, "CyberGuard and Webwasher: The Value Proposition," A CyberGuard Corporation White Paper, May 2004, 6 pages.

e=Security, Inc., Correlation Technology for Security Event Management, Oct. 7, 2002 [online]. eSecurityins.com [retrieved Apr. 18, 2003]. Retrieved from the Internet:<URL:http://www.esecurityinc.com/downloads/Correlation_WP.pdf>.

Marketing, "Digital Certificates—Best Practices—A Microdasys Whitepaper," bestpractice.doc, Revision 1.1 (Jul. 31, 2003), 6 pages, Czech Republic.

Microdasys, "S C I P Secured Content Inspection: Protecting the Enterprise from CryptoHacks," 2003 by Microdasys Inc., 2 pages, Czech Republic.

MyNetWatchman.com web pages indicating 9/00 beta release [online]. MyNetWatchman.com [retrieved Apr. 18, 2003]. Retrieved from the Internet<URL:http://www.mynetwatchman.com/mynetwatchman>.

Network Computing Solutions—"Microdasys SCIP" [online]. Retrieved on Mar. 18, 2005. Retrieved from the Internet<URL:http://www.ncs/cz/index.php?language=en&menuitem-4&subitem=13>, 2 pages, Czech Republic.

Network Computing Solutions—NSC Homepage—News [online]. Retrieved on Mar. 18, 2005. Retrieved from the Internet<URL:http:/nsc.cz/index/php?language=en&menuitem=0&subitem=4&subitem=13>, 3 pages, Czech Republic Parkhouse, Jayne, "Pelican Save TNet 2.0," [online] Jun. 2000, SC Magazine Product Review, [retrieved Dec. 1, 2003] Retrieved from the Internet<URL:http://www.scmagazine.com/standalone/pelican/sc_pelican.html>.

"PostgreSQL Interactive Documentation," May 2001, [online] [Archived by http://archive.org on Jun. 6, 2001; Retrieved on Dec. 19, 2006] Retrieved from the Internet<URL:http://web.archive.org/web/20010606011227/www.postgresql.org/idocs/index.php?overv...>.

2000 Review of eSecurity product on Network Security web page [online]. SCMagazine.com [retrieved Apr. 18, 2003]. Retrieved from the Internet<URL:http://www.scmagazine.com/scmagazine/2000_12/testc/network.htm#Open>.

Schneier, Bruce, Managed Security Monitoring: Network Security for the 21st Century, 2001 [online]. Conterpane.com [retrieved Apr. 18, 2003]. Retrieved from the Internet:<URL:http://www.counter-pane.com/msm.pdf>.

SCIP Product, Microdasys—"The need to control, inspect and manage encrypted webtraffic." [online]. Retrieved on Mar. 18, 2005. Retrieved from the Internet<URL:http://www.microdasys.com/scipproduct+M54a708de802.html>. Author unknown, 2 pages, Czech Republic.

Slashdot.org web pages describing Dshield, dated Nov. 27, 2000 [online]. Slashdot.org [retrieved Apr. 18, 2003]. Retrieved from the Internet: <URL:http://slashdot.org/article.pl?sid=00/11/27/1957238&mode=thread>.

SSL Stripper Home Page, "Security Solutions: Sample Screenshots," [online]. Retrieved on Mar. 18, 2005. Retrieved from the Ineternet<URL:http://www.vroyer.org/sslstripper/index.html>, 2 pages, Oct. 15, 2004, U.S.A.

"SSL Stripper Installation Guide," [online]. Retrieved in Mar. 2005 from the Internet<URL:http://www.sslstripper.com>, 2 pages, U.S.A.

SSL Stripper Sample Screenshots. "Security Solutions: Sample Screenshots," [online]. Retrieved on Mar. 18, 20056. Retrieved from the Internet<URL:http://www.vroyer.org/sslstripper/screenshots.html>, 3 pages, Oct. 15, 2004, U.S.A.

Symantec™ Incident Manager http://enterprisesecurity.symantec.com, copyright date Jun. 2003.

Web page, announcing Nov. 11, 2000 release of Dshield [online]. Deja.com [retrieved Apr. 18, 2003]. Retrieved from the Internet<URL:http://groups/google.com/groups?selm=8vm48v%245pd%241%40nnrp1.deja.com&oe=UTF-8&output=gplain>.

Webwasher AG/Full feature set, "Full feature set," [online]. Retrieved on Mar. 18, 2005. Retrieved from the Internet<URL:http://www.webwasher.com/enterprise/products/webwasher_products/ssl_scanner/full_feature_set..html?l...>, 2 pages.

Webwasher AG/Webwasher Anti Spam, "Webwasher Anti Spam," [online]. Retrieved on Mar. 18, 2005. Retrieved from the Internet<URL:http://www.webwasher.com/enterprise/products/webwasher_products/anti_spam/index.htm...>, 1 page.

Webwasher AG/Webwasher Anti Virus, "Webwasher Anti Virus," [online]. Retrieved on Mar. 18, 2005. Retrieved from the Internet<URL:http://www.webwasher.com/enterprise/products/webwasher_products/anti_virus/index.html..>, 2 pages.

Webwasher AG/Webwasher Content Protection,"Webwasher Content Protection," [online]. Retrieved on Mar. 18, 2005. Retrieved from the Internet<URL:http://www.webwasher.com/enterprise/products/webwasher_products/content_protection/index.html>, 2 pages.

Webwasher AG/Webwasher 1000 CSM Appliance, "Webwasher 1000 CSM Appliance," [online]. Retrieved on Mar. 18, 2005. Retrieved from the Internet<URL:http://www.webwasher.com/enterprise/products/webwasher_products/scm_appliance/index...> 2 pages.

Webwasher AG/Webwasher SSL Scanner, "Webwasher SSL Scanner," [online]. Retrieved on Mar. 118, 2005. Retrieved from the Internet:<URL:http://www.webwasher.com/enterprise/products/webwasher_products/ssl_scanner/index.html>, 2 pages.

Webwasher AG/Webwasher URL Filter, "Webwasher URL Filter," [online]. Retrieved on Mar. 18, 2005. Retrieved from the Internet<URL:http://www.webwasher.com/enterprise/products/webwasher_products/webwasher_url_filter..>, 1 page.

Chung, C.Y. et al., "DEMIDS: A Misuse Detection System For Database Systems," Department Of Computer Science, University Of California At Davis, Oct. 1, 1999, pp. 1-18.

Johnson R., Protecting Your Data and Your Microsoft SQL Server, Entercept Security Technologies, p. 1-12 [online], Oct. 2, 2002, [retrieved on Jan. 30, 2004]. Retrieved from the Internet: <URL: http://networkassociates.com/us/tier2/products/media/mcatee/wp-sq/protection.pdf>.

Kr ügel, C. et al., "A Survey On Intrusion Detection Systems," Distributed Systems Group, Technical University Of Vienna, Dec. 12, 2000, pp. 1-36.

Lee, S.Y. et al., "Learning Fingerprints For A Database Intrusion Detection System," ESORICS 2002, LNCS 2502, pp. 264-279, Nov. 2002, Springer-Verlag, Germany.

Low, W.L. et al., "DIDAFIT: Detecting Intrusions In Databases Through Fingerprinting Transactions," ICEIS 2002—Databases And Information Systems Integration, 2002, pp. 121-128.

Ramasubramanian, P. et al., "Quickprop Neural Network Ensemble Forecasting Framework For A Database Intrusion. Prediction System," Neural Information Processing—Letters And Reviews, Oct. 2004, pp. 9-18, vol. 5, No. 1.

Solutions by Tech Target, Entercept Database Edition, Nov. 2002, [retrieved on Jan. 9, 2004]. Retrieved from the Internet: <URL: http//infosecuritymag.techtarget.com/2002/nov/solutions.shtml>.

Valeur, F. et al, "A Learning-Based Approach To The Detection Of SQL Attacks," Proceedings of the Conference on Detection of Intrusions and Malware & Vulnerability Assessment (DIMVA) , Vienna, Austria, Jul. 2005, 18 pages.

Kruegel, C. et al., "Anomaly Detection of Web-Based Attacks," CCS'03, Oct. 27-31, 2003, ACM, pp. 251-261.

Archive of "Postgre SQL 7.1 Documentation," www.postgresql.org, [online] [Archived by http://archive.org on Jun. 6, 2001; Retrieved May 2001] Retrieved from the Internet<URL:http://web.archive.org/web/20010606011227/www.postgresql.org/idocs/index.php?overv...>.

Halfond, G.J. et al., "Combining Static Analysis and Runtime Monitoring to Counter SQL-Injection Attacks," Workshop on Dymanic Analysis (WODA 2005), May 17, 2005, St. Louis, MO, USA, pp. 1-7.

Oracle, "Understanding Query Expressions," Oracle 8 ConText Cartridge Application Developer's Guide, Release 2.3, 1997, [online] [Retrieved on Mar. 9, 2007] Retrieved from the Internet<URL:http://download-east.oracle.com/docs/cd/A58617_01/cartridg.804/a58164/ch03.htm>.

Pfleeger, Charles P., "Security in Computing," 2nd edition, 1996, pp. 426-433.

Weisstein, E.W., "The CRC Concise Encyclopedia of Mathematics," 1998, p. 1726.

* cited by examiner

DETECTING CODE INJECTION ATTACKS AGAINST DATABASES

CROSS-REFERENCE TO RELATED APPLICATION

This application is related to U.S. patent application Ser. No. 10/819,574, filed Apr. 6, 2004, which is incorporated by reference herein.

BACKGROUND OF THE INVENTION

1. Field of the Invention

This invention pertains in general to computer security and in particular to securing computer databases against code injection attacks.

2. Description of the Related Art

Databases are widespread in modern computing environments. Companies and other enterprises rely on databases to store both public and private data. Many enterprises provide publicly-accessible interfaces to their databases. For example, an electronic commerce web site typically includes a "search" field that accepts search terms and allows an end-user to search items for sale on the site. This search field is a publicly-accessible interface to a database that stores data describing the items for sale.

At a technical level, many of these publicly-accessible databases work by having a web server provide a web browser executing on the client with an HTML and/or JavaScript-based form. The web browser displays this form on the client, and the end-user provides values for the fields in the form. The end-user performs an action, such as pressing a "Submit" button, that causes the web browser to send the entered values to the server. At this point, back-end logic at the server constructs a query to the database using the user-supplied values. This query executes on the database and the server returns the results to the client web browser.

In an SQL (Structured Query Language) injection attack, the attacker fills out the form using specially-crafted data. These data, when used by the server to generate a query to the database, result in a malicious query being sent to the database on behalf of the attacker. The malicious query executes on the database and results in a malicious action.

For example, assume a form asks an end-user for his name and password. A legitimate user might enter "Jim" as his name and "Pickle" as his password. When these values are returned to the server, the server places the values into two variables, for example "name$" and "pass$". The back-end logic constructs a query using the values of these variables. Assume that the query having the variables is:

Query$="SELECT*FROM USERS WHERE NAME= '"+name$+"' AND PASS='"+pass$+"'".

The back-end logic replaces the variables with the user-supplied values and produces the query:

Query$="SELECT*FROM USERS WHERE NAME='Jim' AND PASS='Pickle'".

This query, when executed on the database, validates that the end-user supplied a matching name/password pair by returning the user's information if the data are correct.

To understand an SQL injection attack, consider what would happen if the user supplied the specially-crafted string:

'OR AGE>=0-- as the name and "any" as the password. The back-end logic will construct the query to the database as:

Query$="SELECT*FROM USERS WHERE NAME=' 'OR AGE>=0--' AND PASS='any'"

As it turns out, the "--" sequence denotes a comment in SQL, so the resulting query is interpreted as follows:

SELECT*FROM USERS WHERE NAME=' 'OR AGE>=0

This query will select all users from the USERS table where the user's name is equal to the empty string ' ' OR where the user's AGE (another field in the database in this example) is greater than or equal to zero years old. Since every user is at least zero years old, this augmented query will select all users and return their results to the attacker.

By using the techniques illustrated in this example, the attacker can inject code to obtain access to credit card numbers and other confidential information, modify or delete information on the database, or perform other malicious actions. Thus, there is a need in the art for a way to detect malicious queries and prevent them from executing on the database.

BRIEF SUMMARY OF THE INVENTION

The above need is met by a database server that compares an incoming query against a set of template queries in order to determine whether the incoming query is legitimate, malicious (i.e., includes injected code), or anomalous. The database server receives an incoming query from a web server or another entity and converts the query into its canonical form. The database server compares the canonical incoming query with stored template queries. The template queries are canonical forms of queries known to be legitimate. If the input query matches one of the stored template queries, then the query is legitimate. Accordingly, one embodiment of the database server executes the query on a database.

If the canonical incoming query does not match one of the stored template queries, then the database server determines whether the incoming query is malicious or anomalous. The database server identifies tokens in the incoming query that are not present in a similar template query. If the tokens have meaning in the language utilized to express the query, the database server declares the query malicious. Otherwise, the database server declares the query anomalous.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
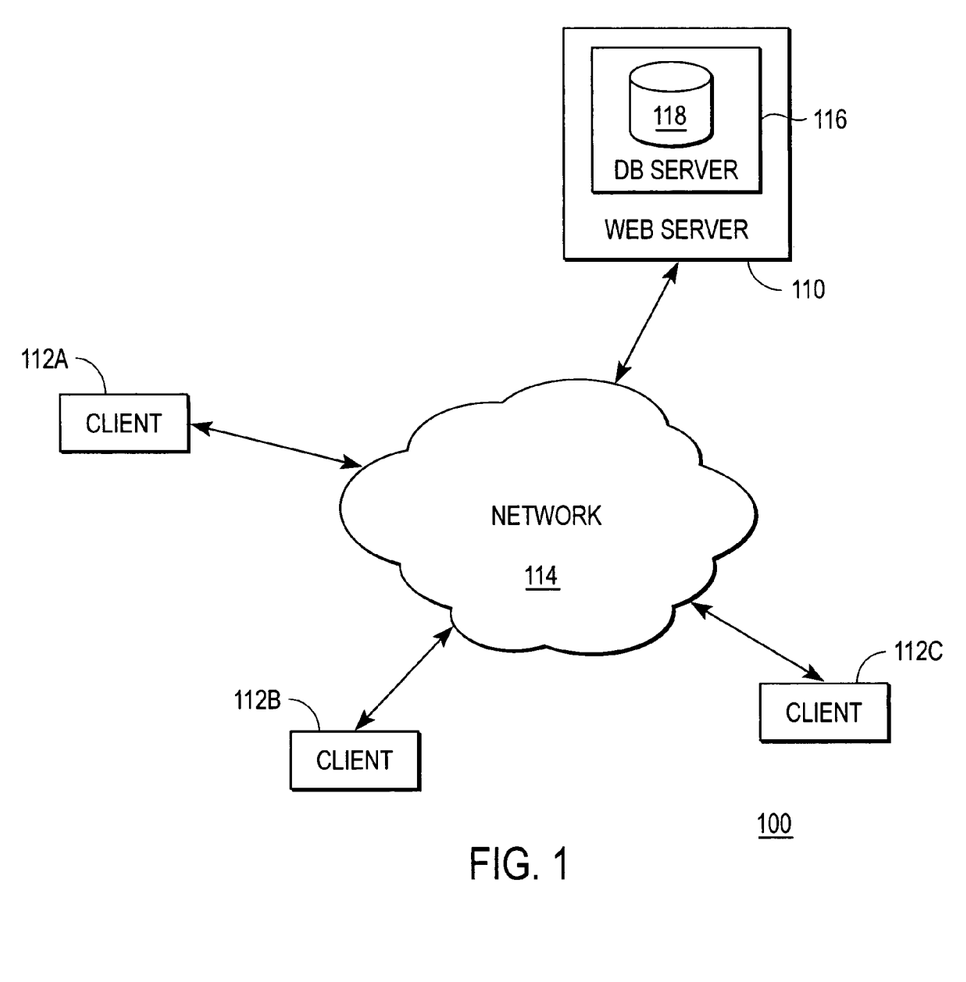
FIG. 1 is a high-level diagram illustrating a typical environment where it is desirable to block code injection attacks against a database.

FIG. 1 is a high-level diagram illustrating a typical environment 100 where it is desirable to block code injection attacks against a database. The environment includes a web server 110 in communication with multiple client computers 112 via a network 114. Only three client computers 112 are shown in FIG. 1 for purposes of clarity, but those of skill in the art will recognize that typical environments can have hundreds or thousands of client computers 112, and can also have multiple web servers 110. Although not shown in FIG. 1, there can be many other computers connected to the network 110.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

The network 114 enables data communication between and among the entities connected to the network and in one embodiment is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The web server 110 exchanges data with the client computers 112 via the network 114. In one embodiment, the web server 110 is in communication with a database server 116 having a database 118. The database server 116 is shown within the web server 110 of FIG. 1, although this is not necessarily the case. In one embodiment, the database server 116 functionality is integrated into the web server 110 and in another embodiment the database server 116 is a discrete entity. Depending upon the embodiment, the database server 116 can be proximate to, or remote from, the web server 110. As described in more detail below, the database server 116 includes functionality for detecting and preventing database code injection attacks.

In one embodiment, the web server 110 exchanges data with the client computers 112 using HTTP and/or other protocols. The exchanged data provides a means by which the client computers can access the database 118. The web server 110 receives data from the client computers 112, uses the data to generate queries, and passes the queries to the database server 116. The database server 116 verifies that queries are legitimate, executes the legitimate queries on the database 118 and, in some embodiments, passes the results of the queries back to the web server 110. The web server 110 can pass the results of the queries back to the client computers 112.

For example, the web server 110 can use HTTP to provide the client computers 112 with HTML-encoded web pages having forms for entering data. The web server 110 receives query strings from the client computers 112 incorporating data entered into the forms. The web server 110 extracts the data from the query strings and uses the data to create queries which it then passes to the database server 116 for execution. In one embodiment, the queries are formulated in the Structured Query Language (SQL), but other embodiments can use other languages or techniques for representing the queries. The web server 110 provides the results of the query to the client computers 112 via new HTML-encoded web pages.

In another example, the web server 110 uses web services to interact with the client computers 112. The web server 110 utilizes an XML schema that is provided to, or otherwise known by, the client computers 112. The web server 110 receives messages encoded using the XML schema from the client computers 112 via SOAP over HTTP. The web server 110 parses the XML-encoded messages to extract data, and uses the data to create the queries executed by the database server 116.

The client computers 112 are utilized by end-users to interact with the web server 110. In one embodiment, a client computer 112 is a typical personal computer such as an IBM-PC or Apple Macintosh compatible computer. In another embodiment, a client computer 112 is another type of electronic device, such as a cellular telephone, personal digital assistant (PDA), portable email device, etc. In one embodiment, a client computer 112 executes a web browser that receives an HTML-encoded web page from the web server 110 and displays it to the end-user. The web page contains a form for accepting information. The end-user uses a keyboard or other user input device to provide information into the form, and the web browser encodes the information in a query string and sends it to the web server 110. In another embodiment, a client computer 112 executes a program for interfacing with the web server 110 using web services.

Figure 2:
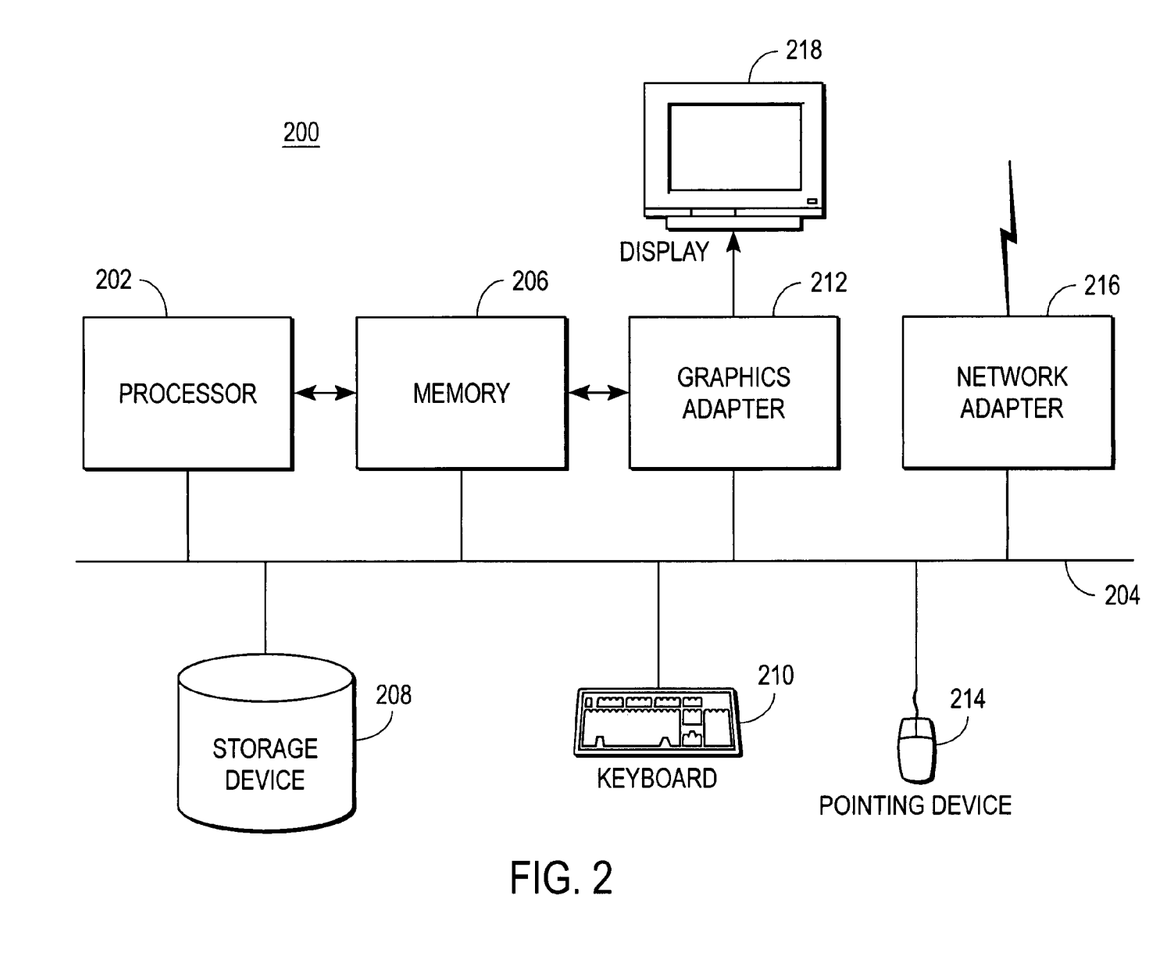
FIG. 2 is a high-level block diagram showing a computer system for acting as a web server, database server, and/or a client computer according to one embodiment.

FIG. 2 is a high-level block diagram showing a computer system 200 for acting as a web server 110, database server 116, and/or a client computer 112 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. Computer systems acting in different roles may have different and/or additional elements than the ones shown in FIG. 2. For example, a computer system 200 acting as a web 110 or database 116 server may have greater processing power and a larger storage device than a computer system acting as a client computer 112. Likewise, a computer system acting as a web 110 or database 116 server may lack devices such as a display 218 and/or keyboard 210 that are not necessarily required to operate it.

As is known in the art, the computer system 200 is adapted to execute computer program modules. As used herein, the term "module" refers to computer program logic for providing the specified functionality. A module can be implemented in hardware, firmware, and/or software. When utilized, the modules are loaded into the memory 206 and executed by the processor 202.

Figure 3:
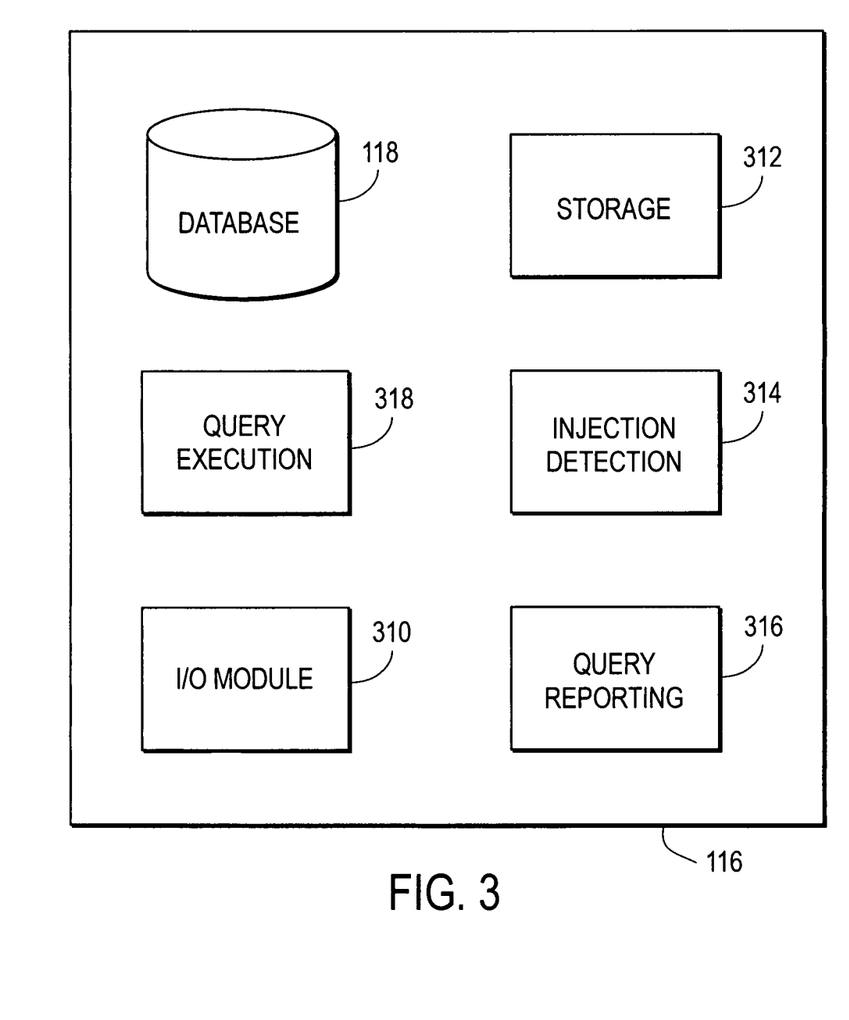
FIG. 3 is a high-level block diagram illustrating a more detailed view of the database server according to one embodiment.

FIG. 3 is a high-level block diagram illustrating a more detailed view of the database server 116 according to one embodiment. The database server 116 includes a database 118 storing a collection of information. The information can include, for example, names, addresses, credit card numbers, products offered for sale, medical histories, etc. In one embodiment the database 118 is a relational database and in another embodiment the database is a flat-file database. Although the database 118 is shown within the database server 116, it can in fact be external and/or remote from the database server 116. Depending upon the embodiment, the database 118 can be centralized at one location or distributed over multiple locations.

The database server 116 includes an input/output (I/O) module 310. The I/O module 310 receives incoming queries from the web server 110 and/or other entities and also provides the results of the queries and/or determinations of whether the queries are legitimate, malicious, or anomalous to the appropriate entities. In one embodiment, a query is defined as an ordered set of tokens and parameterizable fields. A token is an independent unit of meaning in the language in which the query is specified. For example, in the SQL embodiment the "SELECT" statement is a token. Other tokens include the comment symbol (--), mathematical operators (e.g., +, −, and =), etc.

A parameterizable field is a location in a query where a variable is replaced with a literal for execution. The literal is typically based on a user-defined value such as a string or number. For example, the SQL fragment

WHERE NAME="'"+NAME$+"'"

defines a parameterizable field where the variable NAME$ is replaced by the user-defined literal for execution. In one embodiment, the query received by the I/O module 310 already includes the user-defined literal in place of the variable. In another embodiment, the query received by the I/O module 310 receives the user-defined literals as parameters, and the I/O module 310 replaces the variables with the corresponding literals.

The results of the query output by the I/O module 310 in one embodiment are the data in the database 118 satisfying the query. The results can likewise include one or more return codes indicating whether the query successfully executed and/or other information about the query execution. In one embodiment, the I/O module 310 returns a value describing whether the database server 116 found the query to be legitimate, malicious, or anomalous.

A storage module 312 holds templates representing canonical forms of known legitimate queries executed by the database server 116. In one embodiment, the templates are generated using the technique described in U.S. patent application Ser. No. 10/612,198, which is incorporated herein by reference. According to this technique, the templates are generated by observing all incoming queries to the database during a training period. Each query is added to an approved list of queries, and each query in the approved list is canonicalized (i.e., generalized) so it can be used to match different instances of the same query.

In one embodiment, the queries are canonicalized by removing the literals (i.e., the specific string and/or numeric values) from the parameterizable fields. For example, consider the two following non-canonicalized SQL queries:

SELECT*FROM USERS WHERE NAME='cindy' AND PASS='boop'

SELECT*FROM USERS WHERE NAME='abe' AND PASS='network'.

Each of these queries has multiple ordered tokens and two parameterizable fields, "NAME" and "PASS." These queries are canonicalized to a single query template as follows:

SELECT*FROM USERS WHERE NAME=
' ' and PASS=' '.

Thus, each query template in this embodiment contains a set of ordered tokens and parameterizable fields. In other embodiments, the query templates are generated using other techniques in addition to, or instead of, the one described here.

In one embodiment, the storage module 312 also stores a set of data describing tokens having meaning in the language used to specify the queries. For example, in the SQL embodiment the storage module 312 stores a set of data describing SQL keywords (e.g., "exists" "member," "concat," "and"), operators (e.g., "=", "−," "+"), and special strings (e.g., comment indicators like "--" and "/*"). In one embodiment, the set of data stores the tokens as text strings or in another format that supports rapid comparison with other text strings.

In one embodiment, an injection detection module 314 evaluates an incoming database query against the query templates and determines whether the incoming query is legitimate, malicious (i.e., contains injected code) or anomalous. In one embodiment, the injection detection module 314 canonicalizes the incoming query. A query that includes an injection attack might be malformed, in which case the canonicalization process can fail. In one embodiment, if the canonicalization is successful, the injection detection module 314 compares the canonicalized query to the query templates in the storage module 312. If the canonicalized incoming query exactly matches any of the template queries, then in one embodiment the incoming query is considered legitimate.

If the canonicalized incoming query does not match a template query, or the incoming query cannot be canonicalized, then the incoming query is either malicious (i.e., a code injection attack) or anomalous. The injection detection module 314 performs additional tests on the incoming query to determine whether it is malicious. These tests are described below in relation to FIGS. 4 and 5.

A query reporting module 316 reports the results of the analyses performed by the injection detection module 314. The query reporting module 316 is operator-configured to provide different types of alerts based on the classification of the query. For example, the query reporting module 316 can be configured to generate a high-priority alert when a malicious query is detected, and a low-priority alert when an anomalous query is detected. In one embodiment, the output of the query reporting module 316 is provided to the I/O module 310. In another embodiment, the query reporting module 316 provides its report to other internal and/or external modules.

A query execution module 318 executes the input query on the database 318. In one embodiment, the query execution module 318 utilizes the results of the analyses performed by the injection detection module 314 to determine whether to execute the query. For example, the query execution module 318 can be configured to execute all queries classified as legitimate, but to not execute any queries classified as anomalous or malicious. Other embodiments can respond to the classifications in different manners.

Figure 4:
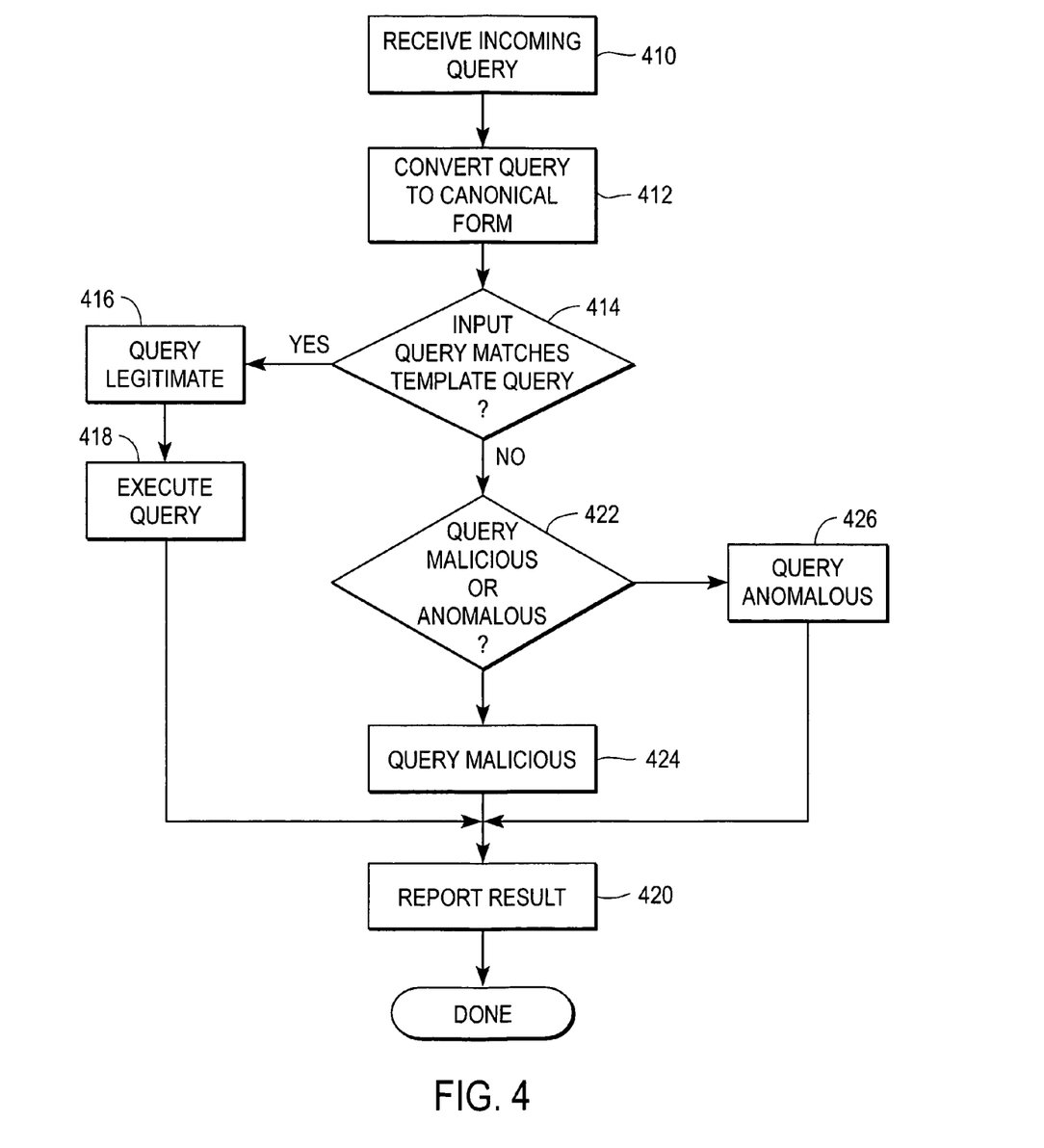
FIG. 4 is a flow chart illustrating steps performed by the database server and/or other entities according to one embodiment.

FIG. 4 is a flow chart illustrating steps performed by the database server 116 and/or other entities according to one embodiment. Not every possible step is shown in the figure. In addition, some embodiments perform different steps in addition to, or instead of, the ones described herein. Furthermore, the order of the steps can vary from that described herein. In one embodiment, the majority of the steps illustrated in FIG. 4 are performed by the injection detection module 314.

The database server 116 receives 110 an incoming query from the web server 110 or another entity. The database server 116 converts the incoming query into its canonical form 412, if possible. Next, the database server 116 compares the canonical incoming query with the stored template queries. If 414 the canonical incoming query matches one of the stored template queries, then the query is legitimate 416. Accordingly, one embodiment of the database server 116 executes 418 the query on the database 118. The database server 116 reports 420 the results of the query back to the web server 110 and/or another entity.

If 414 the canonical incoming query does not match one of the stored template queries, or the incoming query cannot be canonicalized, then one embodiment of the database server 116 performs 422 additional tests to determine whether the query is malicious or anomalous. If the additional tests show that the query is malicious 424, the database server 116 reports 420 this result. If the tests show that the query is anomalous 426, the database server 116 likewise reports 420 this result.

Figure 5:
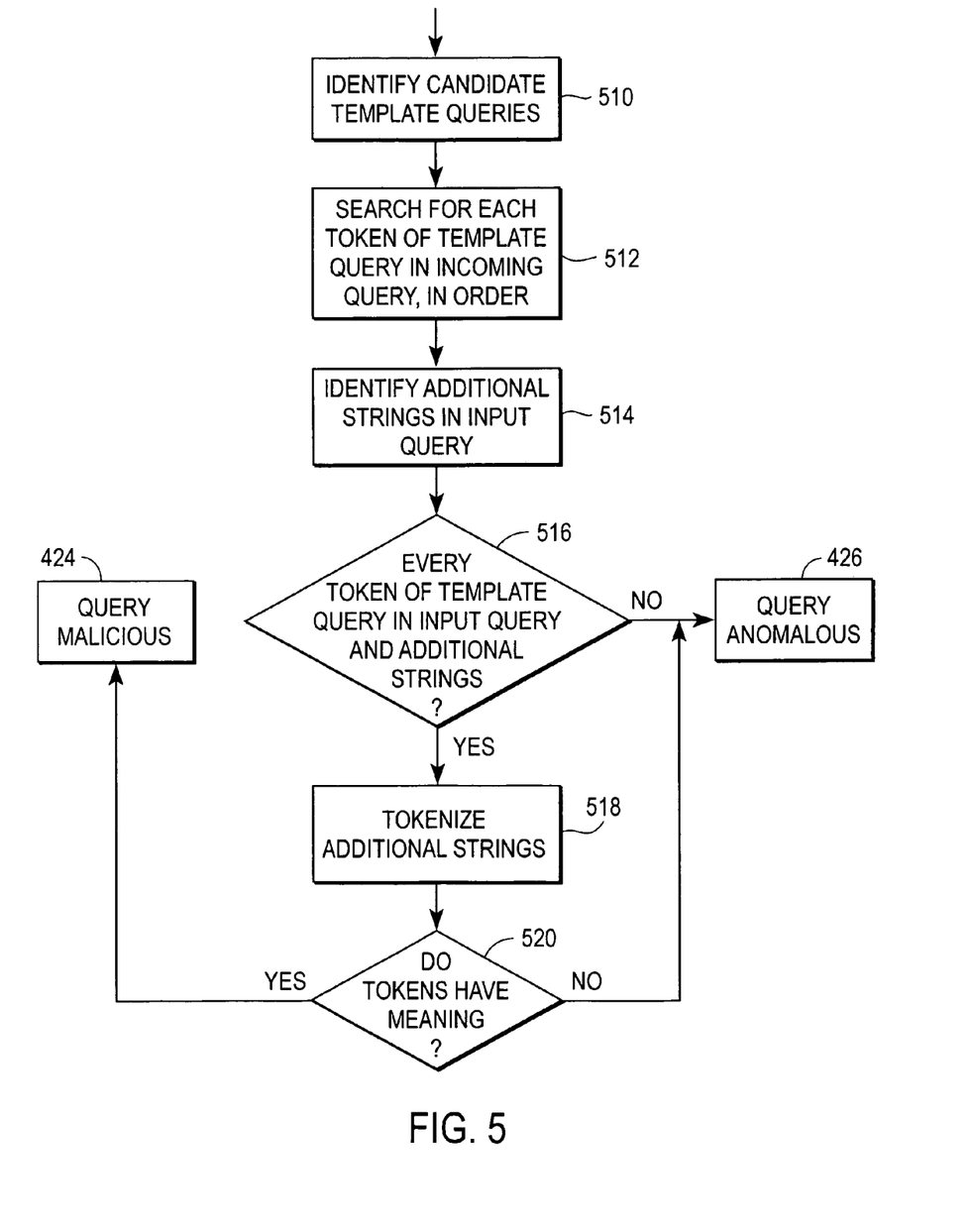
FIG. 5 is a flow chart illustrating steps performed by the database server in determining whether an incoming query is malicious or anomalous according to one embodiment.

FIG. 5 is a flow chart illustrating steps performed by the database server 116 in determining whether an incoming query is malicious or anomalous (step 422) according to one embodiment. Some embodiments perform different steps in addition to, or instead of, the ones described herein. Furthermore, the order of the steps can vary from that described herein. In one embodiment, the majority of the steps illustrated in FIG. 5 are performed by the injection detection module 314.

Recall that in one embodiment, the steps of FIG. 5 are performed only if the canonical incoming query does not match one of the template queries. Although no template query was a perfect match, the database server 116 identifies the set of closest matching template queries. In one embodiment, the set is identified 510 by comparing the non-canonicalized incoming query with each of the template queries using a string comparison function that generates a metric indicating the degree of similarity. The database server 116 selects the n best template queries for further analysis. Depending upon the embodiment, n can be 1 or some other number, such as 5. The remainder of this discussion assumes that the database server 116 selects only 1 template query for further analysis.

The database server 116 determines 512 if all of the tokens in the candidate template query are present in the non-canonicalized incoming query, in the same order. In one embodiment, this determination 512 is performed by selecting a token in the template query (e.g., "USERS") and using string matching to determine whether the characters forming the token are present in the incoming query. This process is repeated for each token of the template query, and the tokens are selected in the order that they appear in the template query. In one embodiment, the database server 116 does not search for certain tokens in the incoming query. For example, it is unnecessary to search for tokens occurring prior to the first "WHERE" in an SQL statement because no code injections are possible prior to that point. In addition, the database server 116 does not search for tokens that are artifacts of the canonicalization process, such as wildcards, because such tokens are not necessarily found in the incoming query.

The database server 116 identifies 514 any strings in the incoming query that are found between two matching tokens and/or after the final matching token. Since these additional strings are found in the incoming query but are not present in the template query, the additional strings were possibly introduced through a code injection attack. In one embodiment, the database server 116 stores any additional strings for analysis after all of the tokens of the template query have been sought in the incoming query. In another embodiment, the database server 116 analyzes each additional string as it is found.

If 516 not every token in the template query is found in the incoming query or no additional strings are found, the database server 116 declares 426 the query anomalous. Otherwise, the database server 116 tokenizes 518 each additional string found in the incoming query by separating the string into character sequences. This tokenization can be performed, for example, by declaring that each set of characters between two spaces forms a token. The database server 116 then determines 520 whether any of the tokens from the additional strings have meaning within the query language. In one embodiment, this latter step is performed by determining whether any of the tokens are found in the set of meaningful SQL tokens stored in the storage module 312. If 520 any token is found in the set of tokens stored by the storage module 312, then the token was added by a code injection attack and the database server 116 declares the query malicious.

The operation shown in FIGS. 4 and 5 can perhaps be better understood in view of the following example. Assume that the incoming query is:

SELECT*FROM USERS WHERE NAME=
' ' OR AGE>=0--' AND PASS='any'.

This query includes a code injection attack embodied by the string "'OR AGE>=0--" and will not match any of the template queries. The database server 116 will select as the most similar template query:

SELECT*FROM USERS WHERE NAME=
' ' AND PASS=' '.

The database server 116 identifies the first token after the "WHERE" statement in the template query, "NAME," and searches for it in the incoming query. This token is found in the incoming query. Likewise, the next two tokens, "=" and "AND" are found in the incoming query. However, the database server 116 detects that the incoming query contains the additional string "'OR AGE>=0--" between these two tokens.

The database server 116 tokenizes the additional string and searches for each token in the storage module 312. In this example, each token (e.g., the single quote and "OR") are found in the storage module 312 because these tokens have meaning in SQL. Therefore, the database server 116 declares the query malicious.

In one embodiment, the database server 116 performs other tests on incoming queries found to be anomalous and/or malicious in order to reduce false positive detections. One such test performed by an embodiment of the database server 116 is determining whether the one or more additional tokens in the incoming query occur near a parameterizable field in the template query. All code injections will occur around parameterizable fields because these fields are the only places that the attacker can introduce the code. Therefore, one embodiment of the database server 116 does not declare malicious incoming queries that have additional tokens at locations not near parameterizable fields. Further, one embodiment does not declare queries with extra tokens malicious unless the extra tokens occur immediately after a parameterizable field. Depending upon the embodiment, the database server 116 can declare these non-malicious queries as anomalous or legitimate. Other embodiments can use different tests in addition to, or instead of, the ones described herein.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method of determining whether an incoming database query represented in a query language is malicious, comprising:

representing the incoming database query as an ordered set of tokens;

representing a plurality of template queries as ordered sets of tokens;

comparing the ordered set of tokens representing the incoming database query with the ordered sets of tokens representing the template queries;

identifying a template query of the plurality of template queries that is similar to the incoming database query, the similar template query being represented as an ordered set of tokens;

identifying a portion of the ordered set of tokens representing the incoming database query not found in the ordered set of tokens representing the similar template query as an extra token;

determining if all of the tokens in the set of tokens representing the similar template query are in the same order as the set of tokens representing the incoming database query and if the extra token has meaning in the query language;

declaring the incoming query malicious if all of the tokens in the set of tokens representing the similar template query are in the same order as the set of tokens representing the incoming database query, if the set of tokens representing the incoming database query includes the extra token not found in the set of tokens representing the similar template query, and if the extra token has meaning in the query language;

declaring the incoming database query anomalous if the extra token does not have meaning in the query language; and reporting the result of the declaration.

2. The method of claim 1, wherein identifying the portion of the incoming database query not found in the similar template query as the extra token comprises:

searching for each token of the similar template query in the incoming database query, in order; and for adjacent tokens in the similar template query that are found in order in the incoming database query, identifying any portion of the incoming database query between the adjacent tokens as the extra token.

3. The method of claim 2, wherein a last token of the similar template query is found in the incoming database query, the method further comprising:

identifying any portion of the incoming database query occurring after the token matching the last token of the similar template query as the extra token.

4. The method of claim 1, wherein identifying the portion of the incoming database query not found in the similar template query as the extra token comprises:

identifying only a portion of the incoming database query occurring after a specified position in the incoming database query.

5. The method of claim 4, wherein the specified position is a first literal occurring in the incoming database query.

6. The method of claim 1, wherein identifying the template query of the plurality of template queries that is similar to the incoming database query comprises:

applying a similarity metric to the incoming database query and the plurality of template queries; and identifying a set of template queries where the similarity metric produces a score above a threshold.

7. A computer system for determining whether an incoming database query is malicious, comprising:

a processor adapted to execute computer program modules;

a memory device coupled to the processor;

a representation module adapted to load into the memory device and cause the processor to represent the incoming database query as an ordered set of tokens and represent a plurality of template queries as ordered sets of tokens;

a comparing module adapted to load into the memory device and cause the processor to compare the ordered set of tokens representing the incoming database query with the ordered sets of tokens representing the template queries, to identify a template query of the plurality of template queries that is similar to the incoming database query, the similar template query being represented as an ordered set of tokens, to identify a portion of the ordered set of tokens representing the incoming database query not found in the ordered set of tokens representing the similar template query as an extra token and to determine if all of the tokens in the set of tokens representing the similar template query are in the same order as the set of tokens representing the incoming database query and if the extra token has meaning in the query language; and a reporting module adapted to load into the memory device and cause the processor to declare the incoming query malicious if all of the tokens in the set of tokens representing the similar template query are in the same order as the set of tokens representing the incoming database query, if the set of tokens representing the incoming database query includes the extra token not found in the set of tokens representing the similar template query, and if the extra token has meaning in the query language, the reporting module further adapted to cause the processor to declare the incoming database query anomalous if the extra token does not have meaning in the query language, and the reporting module further adapted to cause the processor to report the result of the declaration.

8. The computer system of claim 7, wherein the query language is SQL.

9. The computer system of claim 7, wherein to identify the portion of the incoming database query not found in the similar template query as the extra token comprises to:

search for each token of the similar template query in the incoming database query, in order; and for adjacent tokens in the similar template query that are found in order in the incoming database query, identify any portion of the incoming database query between the adjacent tokens as the extra token.

10. The computer system of claim 9, wherein a last token of the similar template query is found in the incoming database query, the reporting module is further adapted to cause the processor to:

identify any portion of the incoming database query occurring after the token matching the last token of the similar template query as the extra token.

11. The computer system of claim 7, wherein to identify the portion of the incoming database query not found in the similar template query as the extra token comprises to:

identify only a portion of the incoming database query occurring after a specified position in the incoming database query.

12. The computer system of claim 11, wherein the specified position is a first literal occurring in the incoming database query.

13. The computer system of claim 7, wherein to identify the template query of the plurality of template queries that is similar to the incoming database query comprises to:
  apply a similarity metric to the incoming database query and the plurality of template queries; and
  identify a set of template queries where the similarity metric produces a score above a threshold.

14. A computer program product having a computer-readable storage medium having encoded therein computer program instructions for determining whether an incoming database query is malicious, comprising:
  a representation module adapted to represent the incoming database query as an ordered set of tokens and represent a plurality of template queries as ordered sets of tokens;
  a comparing module adapted to compare the ordered set of tokens representing the incoming database query with the ordered sets of tokens representing the template queries, to identify a template query of the plurality of template queries that is similar to the incoming database query, the similar template query being represented as an ordered set of tokens, to identify a portion of the ordered set of tokens representing the incoming database query not found in the ordered set of tokens representing the similar template query as an extra token, and to determine if all of the tokens in the set of tokens representing the similar template query are in the same order as the set of tokens representing the incoming database query and if the extra token has meaning in the query language; and
  a reporting module adapted to declare the incoming query malicious if all of the tokens in the set of tokens representing the similar template query are in the same order as the set of tokens representing the incoming database query, if the set of tokens representing the incoming database query includes the extra token not found in the set of tokens representing the similar template query, and if the extra token has meaning in the query language, the reporting module further adapted to declare the incoming database query anomalous if the extra token does not have meaning in the query language, and the reporting module further adapted to report the result of the declaration.

15. The computer program product of claim 14, wherein the query language is SQL.

16. The computer program product of claim 14, wherein to identify the portion of the incoming database query not found in the similar template query as the extra token comprises to:
  search for each token of the similar template query in the incoming database query, in order; and
  for adjacent tokens in the similar template query that are found in order in the incoming database query, identify any portion of the incoming database query between the adjacent tokens as the extra token.

17. The computer program product of claim 16, wherein a last token of the similar template query is found in the incoming database query, the reporting module is further adapted to
  identify any portion of the incoming database query occurring after the token matching the last token of the similar template query as the extra token.

18. The computer program product of claim 14, wherein to identify the portion of the incoming database query not found in the similar template query as the extra token comprises to:
  identify only a portion of the incoming database query occurring after a specified position in the incoming database query.

19. The computer program product of claim 18, wherein the specified position is a first literal occurring in the incoming database query.

20. The computer program product of claim 14, wherein to identify the template query of the plurality of template queries that is similar to the incoming database query comprises to:
  apply a similarity metric to the incoming database query and the plurality of template queries; and
  identify a set of template queries where the similarity metric produces a score above a threshold.

21. The method of claim 1, wherein representing the incoming database query as the ordered set of tokens comprises:
  representing the incoming database query in a canonical form.

22. The computer system of claim 7, wherein the representation module is further adapted to cause the processor to represent the incoming database query in a canonical form.

23. The computer program product of claim 14, wherein the representation module is further adapted to represent the incoming database query in a canonical form.

* * * * *